(12) United States Patent
Schmid

(10) Patent No.: US 7,192,036 B2
(45) Date of Patent: Mar. 20, 2007

(54) MANUALLY MOVABLE TROLLEY

(75) Inventor: Johann Schmid, Kirchheim/Ortsteil Derndorf (DE)

(73) Assignee: Wanzl Metallwarenfabrik GmbH, Leipheim (DE)

( * ) Notice: Subject to any disclaimer, the term of this patent is extended or adjusted under 35 U.S.C. 154(b) by 119 days.

(21) Appl. No.: 11/160,442

(22) Filed: Jun. 23, 2005

(65) Prior Publication Data

US 2005/0225045 A1 Oct. 13, 2005

Related U.S. Application Data

(63) Continuation-in-part of application No. PCT/DE04/00016, filed on Jan. 9, 2004.

(30) Foreign Application Priority Data

Feb. 6, 2003 (DE) ................ 103 04 962

(51) Int. Cl.
B62D 39/00 (2006.01)
(52) U.S. Cl. ................ 280/33.994; 16/35 R; 188/1.12
(58) Field of Classification Search .......... 280/33.994, 280/33.992, DIG. 4; 16/35 R; 188/1.12
See application file for complete search history.

(56) References Cited

U.S. PATENT DOCUMENTS

| | | | | |
|---|---|---|---|---|
| 2,494,696 A | * | 1/1950 | Forbes | 16/35 R |
| 2,660,265 A | * | 11/1953 | Middendorf | 188/84 |
| 3,095,211 A | * | 6/1963 | Altherr | 280/33.994 |
| 3,112,121 A | * | 11/1963 | Hummer | 280/33.994 |
| 3,890,669 A | * | 6/1975 | Reinhards | 16/35 R |
| 4,084,663 A | * | 4/1978 | Haley | 188/31 |
| 4,494,272 A | * | 1/1985 | Morita | 16/35 R |
| 4,922,574 A | * | 5/1990 | Heiligenthal et al. | 16/35 R |
| 4,976,447 A | * | 12/1990 | Batson | 280/33.994 |
| 5,325,938 A | * | 7/1994 | King | 188/19 |
| 5,383,536 A | * | 1/1995 | Butter et al. | 188/1.12 |
| 5,390,942 A | * | 2/1995 | Schuster et al. | 280/33.994 |
| 5,669,100 A | * | 9/1997 | Carpenter | 16/35 R |
| 5,675,864 A | * | 10/1997 | Chou | 16/35 R |
| 6,123,343 A | * | 9/2000 | Nolting et al. | 280/33.994 |
| 6,237,725 B1 | * | 5/2001 | Otterson et al. | 188/19 |

(Continued)

FOREIGN PATENT DOCUMENTS

DE 34 42 124 A1 5/1986

(Continued)

Primary Examiner—Christopher Bottorff
(74) Attorney, Agent, or Firm—Buchanan Ingersoll & Rooney PC

(57) ABSTRACT

A manually movable trolley (1) which is nestable with like trolleys, including a frame (3), a loading platform (7) and two upwardly extending uprights (13) located at the rear (4) of the wheel frame (3) and carrying a pushing arrangement (14), wherein a brake device (16) is provided which is controllable by the pushing arrangement (14) and effective when the trolley (1) is not in use. A brake release device (20) is provided underneath the frame (3) close to each rear wheel (9), guided in a wheel housing (10), and release parts (25) each provided with an active surface (26) are arranged on the frame (3) and are adapted to deflect the two brake release devices (20) of the preceding trolley (1') by means of their active surface (26) when two trolleys are nested.

11 Claims, 2 Drawing Sheets

U.S. PATENT DOCUMENTS

| | | | |
|---|---|---|---|
| 6,374,955 B1 * | 4/2002 | Gray | 188/5 |
| 6,481,540 B1 * | 11/2002 | Nolting et al. | 188/19 |
| 6,532,624 B1 * | 3/2003 | Yang | 16/35 R |
| 6,725,501 B2 * | 4/2004 | Harris et al. | 16/35 R |
| 6,782,976 B2 * | 8/2004 | Hewitt | 188/29 |
| 6,865,775 B2 * | 3/2005 | Ganance | 16/35 R |

FOREIGN PATENT DOCUMENTS

| | | |
|---|---|---|
| DE | 36 15 290 A1 | 12/1986 |
| GB | 1 156 349 | 6/1969 |
| GB | 2 176 444 A | 12/1986 |

* cited by examiner

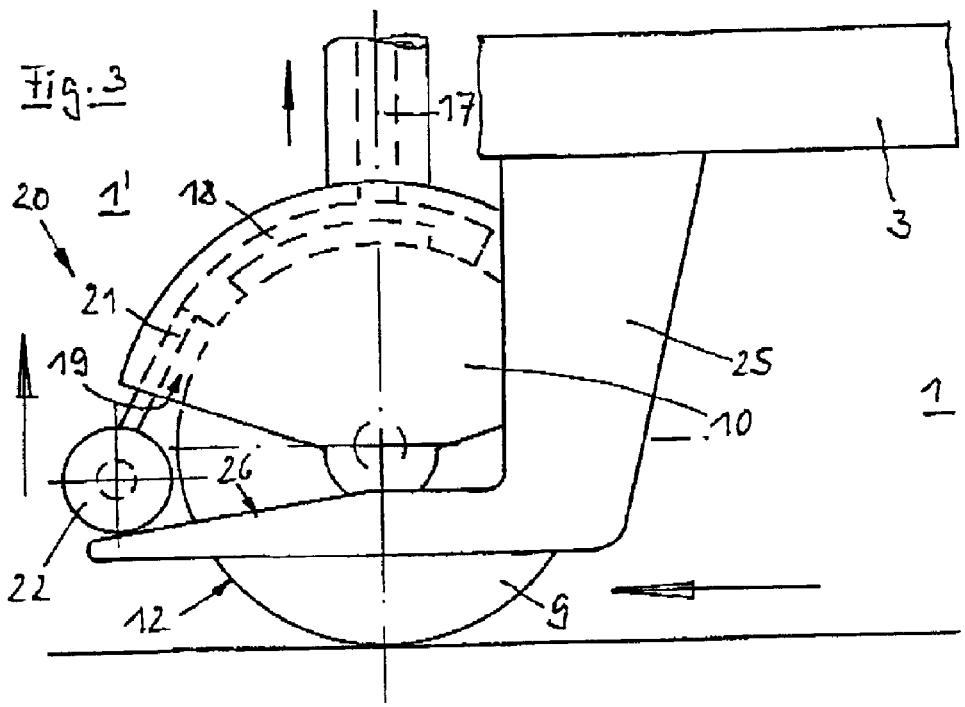
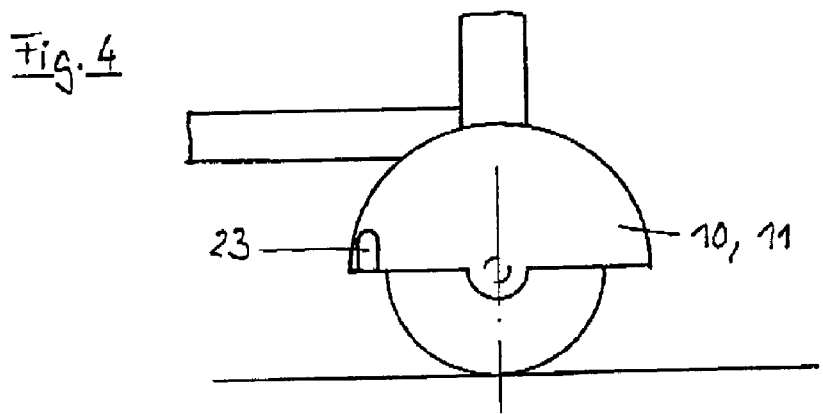
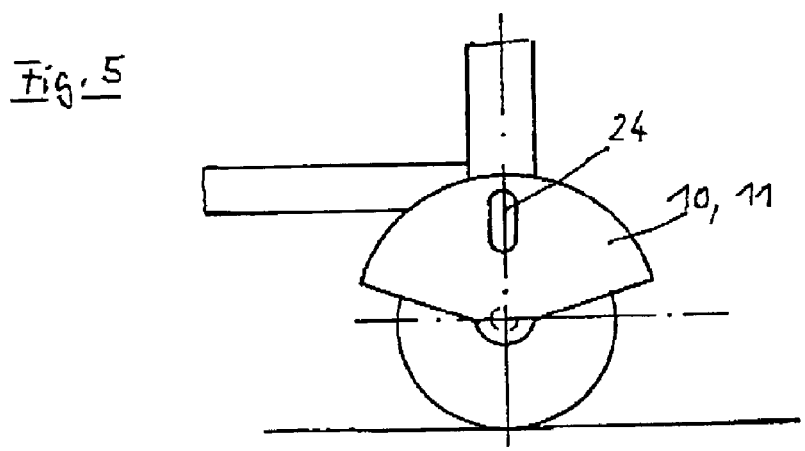

MANUALLY MOVABLE TROLLEY

CROSS-REFERENCE TO RELATED APPLICATIONS

The present application is a continuation-in-part of PCT/DE2004/000016, filed in Germany on Jan. 9, 2004, and further claims priority of DE 103 04 962.2, filed in Germany on Feb. 6, 2003. The entire contents of PCT/DE2004/000016 and DE 103 04 962.2 are incorporated herein by reference.

FIELD OF THE INVENTION

The invention relates to a manually movable trolley which is nestable with like trolleys.

BACKGROUND OF THE INVENTION

DE 34 42 124 A1 describes a trolley that includes a wheel frame, a loading platform and two upwardly extending uprights located at the rear of the wheel frame and carrying a pushing arrangement, wherein a brake device is provided which is controllable by the pushing arrangement and effective when the trolley is not in use and which has two brake rods arranged in the uprights, a brake shoe, acting on a rear wheel, being provided at the lower end of each brake rod, and wherein a brake release device is provided underneath the wheel frame close to each rear wheel, guided in a wheel housing, and release parts each provided with an active surface are arranged on the wheel frame and are intended to deflect the two brake release devices of the preceding trolley by means of their active surface when two trolleys are nested.

The brake release devices of this trolley are each formed by a lever which is pivotably mounted on a horizontal axis and which carries a roller at one end and is connected by its other end to a brake rod extending through an upright on one side. Two longitudinal members of the wheel frame are provided as release parts, the underside of the longitudinal members assuming the function of an active component. When two trolleys are nested in a space-saving manner, the two longitudinal members of the trolley to be pushed in press the rollers of the preceding trolley downwards slightly, with the result that the brake device of this trolley is released. Nevertheless, this design, which is advantageous per se, has disadvantages. For example, the wheel frame of this trolley must be arranged relatively high (see also FIG. 2 of DE 34 42 124 A1) in order to accommodate the two-armed lever of the brake release device. Two axles are necessary for pivotably mounting these levers, and an opening is required in each upright so that each lever can be connected to one of the two brake rods. All these technical features give rise to a trolley, the manufacture of which cannot really be regarded as cost-effective.

OBJECTS AND SUMMARY

An object of the invention is to improve a trolley of the present type so that its brake release device and the connection of the latter to the brake device can be produced and implemented in a simple and cost-effective manner and so that the arrangement just described permits a low-lying wheel frame and with it a low-lying loading platform.

The object is achieved in that each brake release device, extending through a wheel housing from outside, is connected to a brake rod or a brake shoe, and in that the active surface of each release part is located below the underside of the wheel frame.

The proposed solution advantageously provides two brake release devices which are constructed as a simple extension of the brake rods or the brake shoe. The gap which is in any case always present between each wheel housing and each rear wheel can be utilised for this purpose. An opening in each upright, as has been conventional hitherto, is therefore no longer necessary. Advantageously, not only the brake release devices, but also the two release parts are arranged below the wheel frame in a space-saving manner so that the wheel frame and the loading platform are low-lying. Consequently, when loading and unloading the loading platform, the loaded goods do not have to be lifted up high.

BRIEF DESCRIPTION OF THE DRAWINGS

The invention will be described in further detail with the aid of embodiments.

FIG. 3 shows a release part which is about to raise a brake release device; and

FIGS. 4 and 5 show two differently constructed wheel housings.

DETAILED DESCRIPTION OF THE PREFERRED EMBODIMENTS

Figure 1:
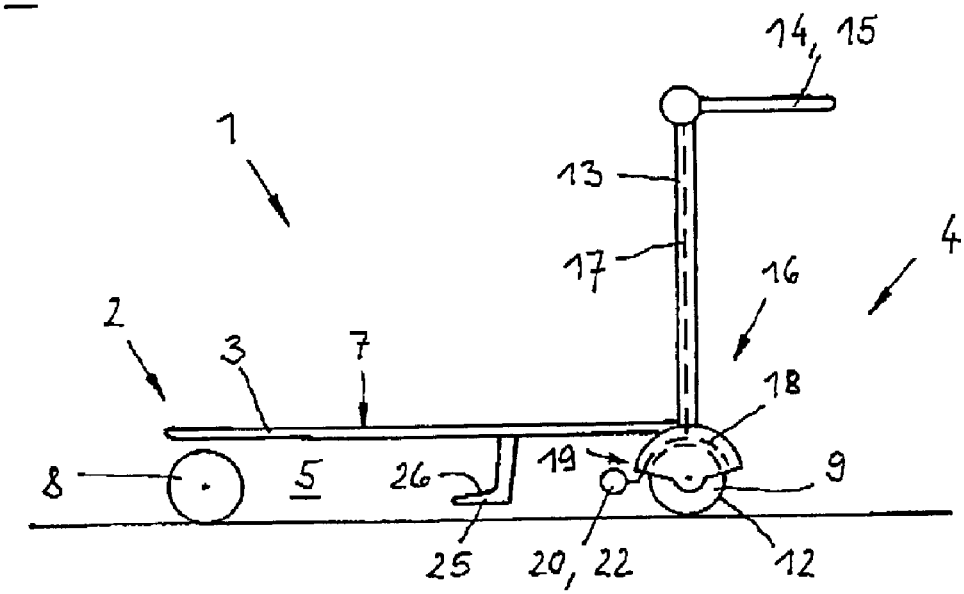
FIG. 1 shows a side view of a trolley.

FIG. 1 schematically shows a side view of a manually movable trolley 1 which is nestable with like trolleys. This trolley comprises a frame 3 provided with a loading platform 7 or forming a loading platform 7. Two upwardly extending uprights 13 are located at the rear 4 of the frame 3 and carry a pushing arrangement 14. In a known manner, the pushing arrangement 14 is constructed so that it can control a brake device 16 which acts on the two rear wheels 9 of the trolley 1.

The trolley 1 is also provided with one or two front wheels 8. The brake device 16 comprises two brake rods 17, one of the downwardly extending brake rods 17 being arranged in each upright 13. At its lower end, each brake rod 17 carries a brake shoe 18 which is intended to rest against the running surface 12 of a rear wheel 9 in the event of a braking action.

Figure 2:
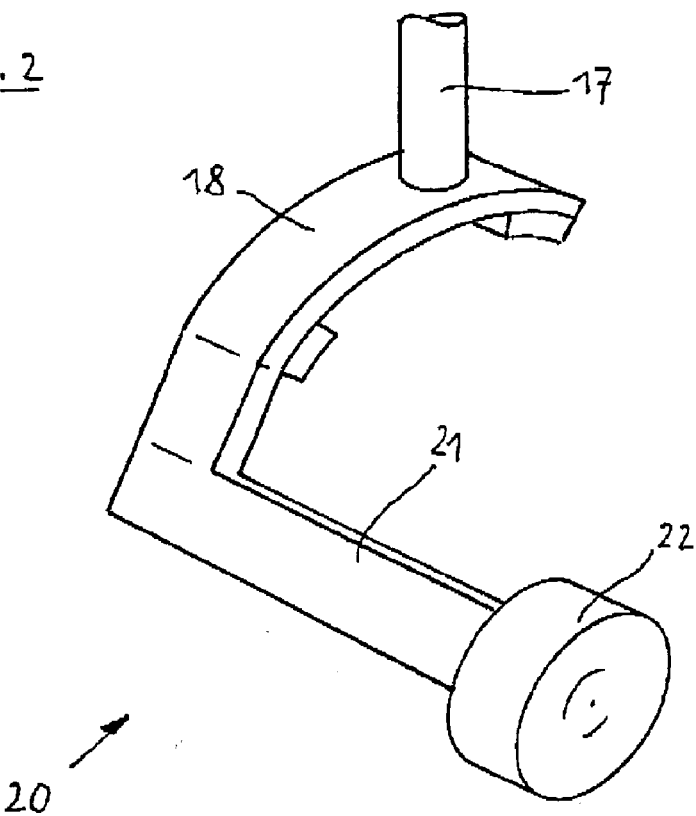
FIG. 2 shows a portion of a brake rod with a brake shoe and brake release device arranged thereon.

A brake release device 20 is arranged below the frame 3 close to each rear wheel 9 and, as shown in FIG. 2, is fixedly connected to each brake shoe 18. In the example, each brake release device 20 has a roller 22.

A release part 25 provided with an active surface 26 is fixedly arranged on each of the longitudinal sides 5 of the frame 3. At least the active surface 26 of each release part 25 is located below the underside 6 of the frame 3. The release parts 25 are arranged nearer to the front end 2 of the trolley 1 than the two brake release devices 20. In a known manner, the brake device 16 is set so that it has a braking effect on the two rear wheels 9 when the trolley 1 is in the position of non-use and the pushing handle 15 of the pushing arrangement 14 is not being operated. Only when the pushing arrangement 14, which is articulated on the brake rods 17, or the pushing handle 15 is tilted can the brake device 16 be released and the trolley 1 pushed or pulled.

FIG. 2 shows the lower part of a brake rod 17 with a curved brake shoe 18 fixedly arranged thereon, the brake shoe 18 being provided for resting or pressing against a rear wheel 9. The brake release device 20 leads away from the brake shoe 18, first in the longitudinal direction of the brake shoe 18, then horizontally and laterally, and comprises an angled crosspiece 21 with a roller 22 arranged thereon and mounted so as to be rotatable about a horizontal axis.

FIG. 3 shows part of the frame 3 and a release part 25, arranged thereon, of a trolley 1 to be pushed into another trolley 1' and also a brake release device 20, a rear wheel 9 and a brake shoe 18 with part of the brake rod 17 of the preceding trolley 1'. The trolley 1 shown on the right is pushed into the preceding trolley 1', i.e., nested in a space-saving manner; see also the horizontal arrow. The drawing shows the moment at which the still rearwardly rising active surface 26 of the release part 25 strikes the roller 22 of the brake release device 20. If the trolley 1 coming from the right is pushed further in the direction of the arrow, the release part 25 with its active surface 26 pushes the roller 22 and thus the brake release device 20 of the preceding trolley 1' upwards, with the result that the brake shoe 18, acting on the rear wheel 9 and connected to the brake release device 20, is lifted from the running surface 12 of the rear wheel 9 and the braking action consequently ceases; see the vertical arrow. In practice, the brake release devices 20 of the preceding trolley 1' are raised by the two release parts 25 of the trolley 1 to be pushed in, as a result of which the braking action of the brake device 16 of the trolley 1' ceases.

In the embodiment just described, the angled crosspiece 21 of each brake release device 20 is located in a gap 19 between a wheel housing 10 and the associated rear wheel 9 (see FIGS. 1 and 3) in order to reach the brake shoe 18 from outside. FIG. 4 shows that it is also possible to guide the crosspiece 21 of each brake release device 20 horizontally and directly towards the brake shoe 18, laterally and from outside through an upwardly extending recess 23 formed in the wheel housing 10. In this embodiment, the crosspiece 21 may be guided through the recess 23.

As shown in another embodiment illustrated in FIG. 5, it is possible to connect the crosspiece 21 of each brake release device 20 to the corresponding brake rod 17 in a detachable or plug-in manner. For this purpose, a preferably elongate, vertically extending, enclosed opening 24 is provided on the inside 11 of each wheel housing 10. The opening 24 in each wheel housing 10 is intended to receive the crosspiece 21 of a brake release device 20. Here, as in the preceding examples, each brake release device 20 leads from outside into the corresponding wheel housing 10 and to the brake shoe 18 or the brake rod 17. Each brake release device 20 is raised in the same way as described in FIG. 3.

It is possible to provide the brake shoe 18 of each brake release device 20 with at least one downwardly extending projection having a vertical slot, through which the axle of the rear wheel 9 extends with slight play. This measure allows each brake release device 20 additionally to be displaceably supported on this axle, which is advantageous when the brake release devices 20 are moved.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A manually movable trolley which is nestable with like trolleys, comprising:

a frame, at least one rear wheel, a rear wheel housing;

a loading platform, at least one upwardly extending upright located at a rear of the frame, a pushing arrangement on the upright, a brake device which is controlled by the pushing arrangement and effective when the trolley is not in use and which has at least one brake rod arranged on the upright, a brake shoe, acting on the rear wheel, the brake shoe being provided at the lower end of the brake rod, a brake release device is provided underneath the frame close to the rear wheel, the brake release device being guided in the rear wheel housing, and at least one release part provided with an active surface is arranged on the frame and is adapted to deflect the brake release device of a preceding trolley by the active surface when two trolleys are nested, the brake release device, extending into the rear wheel housing from outside, is connected to the brake rod or the brake shoe, and the active surface of each release part is located below an underside of the frame.

2. The trolley according to claim 1, wherein the trolley includes two upwardly extending uprights, two brake rods, two rear wheels, two rear wheel housings, and two brake release devices.

3. The trolley according to claim 2, wherein the trolley includes two brake release parts, one on each side of the trolley.

4. A trolley according to claim 1, wherein each brake release device has a roller.

5. A trolley according to claim 1, wherein the brake release parts are arranged nearer to the front end of the trolley than the two brake release devices.

6. A trolley according to claim 1, wherein when two trolleys are nested, the active surface of the release part of the trolley to be pushed in is adapted to raise the brake release device of the preceding trolley.

7. A trolley according to claim 3, wherein each brake release device has a crosspiece, and each crosspiece is guided through a gap, formed between the rear wheel housing and the associated rear wheel, to the respective brake shoe.

8. A trolley according to claim 7, wherein the inside of each rear wheel housing is provided a recess or an opening through which the crosspiece of the corresponding brake release device extends to the brake shoe or the brake rod.

9. A trolley according to claim 3, wherein each brake release device is additionally displaceably supported on the axle of a rear wheel.

10. The trolley according to claim 1, wherein the brake release device includes a crosspiece that extends horizontally from the brake shoe.

11. The trolley according to claim 10, further comprising a roller at the end of the crosspiece.

* * * * *